C. E. GRENELL.
CAMERA SHUTTER.
APPLICATION FILED MAY 9, 1916.
1,231,878. Patented July 3, 1917.
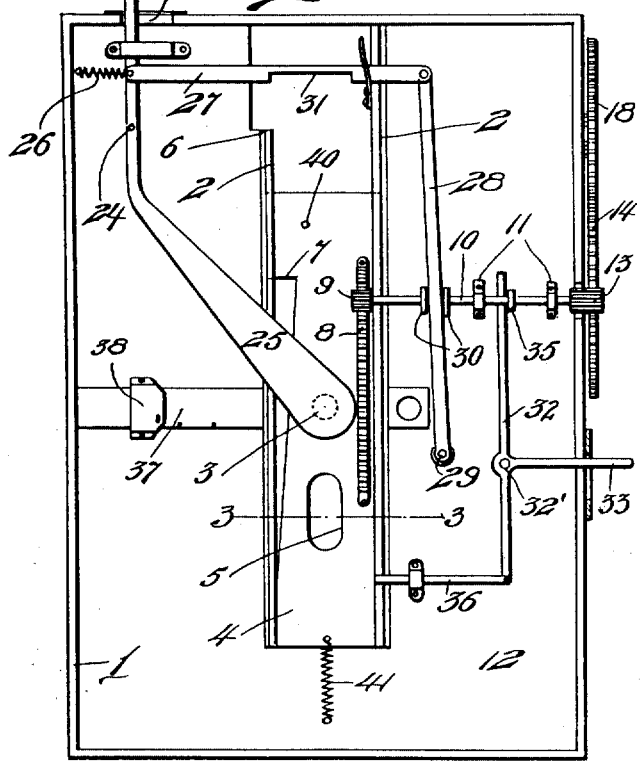
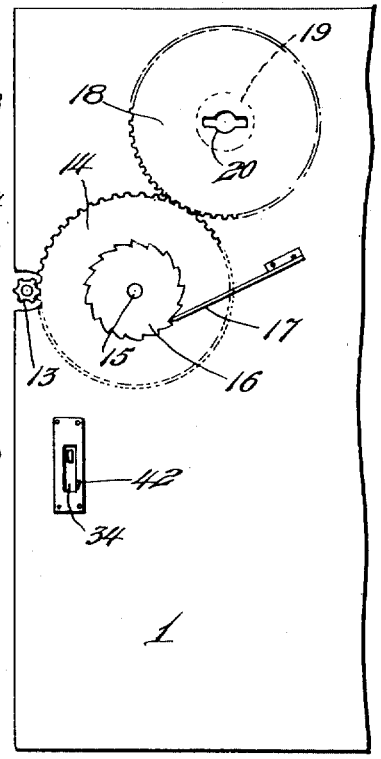
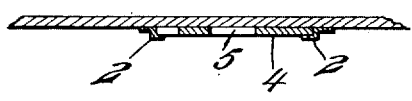
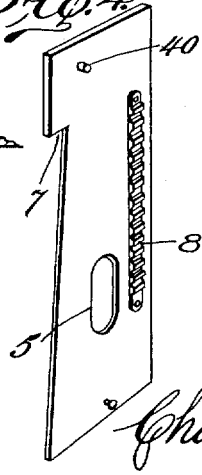
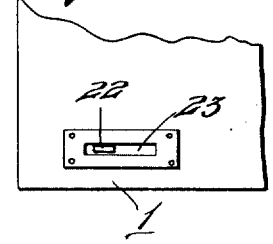
WITNESSES
INVENTOR
Charles E. Grenell
BY
Richard B. Owen
ATTORNEY

UNITED STATES PATENT OFFICE.

CHARLES E. GRENELL, OF DAYTONA, FLORIDA.

CAMERA-SHUTTER.

1,231,878. Specification of Letters Patent. Patented July 3, 1917.

Application filed May 9, 1916. Serial No. 96,442.

*To all whom it may concern:*

Be it known that I, CHARLES E. GRENELL, a citizen of the United States, residing at Daytona, in the county of Volusia and State of Florida, have invented certain new and useful Improvements in Camera-Shutters, of which the following is a specification.

This invention has relation to cameras, and the nature and objects thereof will be readily apparent to those skilled in the art to which it appertains, in the light of the following explanation of the accompanying drawings, illustrating what I now believe to be the preferred embodiment, or mechanical expression, of my invention from among other forms and arrangements within the spirit thereof and the scope of the appended claims.

However, an object of the invention is to provide a camera of the roll film type, embodying a shutter having connection with the film mechanism, whereby the shutter is locked against further movement subsequent to each exposure, said locking means being releasable after the film mechanism has been actuated to position an unexposed film section preparatory to exposure thereof, so as to eliminate the possibility of double exposures.

In addition to the foregoing my invention comprehends improvements in the details of construction and arrangement of parts, to be hereinafter described and particularly pointed out in the appended claims.

In the accompanying drawings in which similar and corresponding parts are designated by the same characters of reference, throughout the several views in which they appear:—

Figure 1, is a view in front elevation of a camera with its front plate removed, illustrating a shutter mechanism constructed in accordance with my invention.

Fig. 2, is a view in side elevation of the front portion of the camera.

Fig. 3, is a transverse section on the line 3—3 of Fig. 1.

Fig. 4, is a view in perspective of the shutter plate.

Fig. 5, is a detail view illustrating the opening through which the shutter actuating lever is extended, and Fig. 6, is a view of the key used for rotating the film roller.

With reference to the drawings, 1 indicates the casing of a camera provided upon its front face with vertical guides 2, one disposed at each side of the exposure opening 3. A shutter plate 4 is provided for vertical movement within the guides and is formed with a shutter opening 5 of predetermined extent. One of the guides 2 is provided with an offset 6 at its upper end for supporting the cutaway edge 7 of the shutter plate, in a manner and for a purpose to be presently noted. A rack bar 8 is secured in a vertical position to the shutter plate and is adapted for meshing engagement with a pinion 9 secured to the inner end of a shaft 10 which is mounted for longitudinal as well as rotative movement in bearings 11 secured to the inner front plate 12 of the camera. The shaft 10 is provided at its outer end with a pinion 13 which is adapted for peripheral engagement with a pinion 14 secured to an idler shaft 15 on the outer side of the camera casing. A ratchet disk 16 is also secured to the shaft 15 and is adapted for rotation in one direction only owing to the provision of a spring pawl 17 which engages the teeth of said ratchet. A pinion 18 having engagement with the pinion 14, is secured to one of the film spools 19 and is formed with a central key-hole recess 20 into which a key 21 is adapted to be inserted when the film is to be wound or unwound for presenting an unexposed section.

A lever 22 is provided with one end thereof extended through an opening 23 in the upper portion of the casing, said lever being fulcrumed at 24 within the casing and formed at its opposite end with a shield 25. The shield is designed to be normally positioned in front of the exposure opening 3 of the camera and is resiliently held in such position by means of a spring 26. A link 27 is disposed horizontally above the upper ends of the guide 2 and is pivoted at one end to the lever 22, and at its other end to one end of a lever 28, the other end of said lever 28 being fulcrumed upon a stud 29. The lever 28 is positioned at right angles to the shaft 10 and is engaged at opposite sides by means of spaced collars 30 secured to said shaft. A cutaway portion 31 is formed in the lower edge of the link 27.

A lever, 32, substantially T-shaped, is pivoted at the juncture of its members to a stud 32' extending from the casing, the intermediate member 33 of said lever passing through an aperture 34 in the side of the camera. One terminal of said lever 32 is extended across the shaft 10 and is engaged by a collar 35 formed upon said shaft, while the other terminal of the lever is pivotally connected to a reciprocable rod 36 having its end adapted to be extended into the path of movement of the lower end of the shutter plate. This lever forms in effect a time exposure setting means.

A slidable diaphragm 37, mounted and guided in its movement by a bracket 38 is provided, and is formed with variable openings adapted to be disposed in front of the exposure opening to limit the aperture thereof.

In operation, the initial winding of the spool 19 to position a film section for exposure, accomplishes the raising of the shutter plate through the medium of the gears 9, 13, 14 and 18, until the cutaway portions 7 of the shutter plate is engaged over the offset portion 6 of one of the guides. The plate is urged into such engagement by means of a light spring member 39 which engages the opposite edge of the plate for that purpose. During the upward movement of the shutter plate, the exposure opening of the camera was covered by the shield 25 during the moment when the opening 5 was in registration with said exposure opening.

The camera is now set for an instantaneous exposure, which is accomplished by moving the lever 22 to the right. As a result of such movement, one end of the cutaway portion 31 of the link 27 is engaged against a pin 40 extending from the face of the plate 4, said pin being disposed in the path of movement of the shoulders of the link 27 when the shutter plate is in raised position. Continued movement of the link 27 toward the right, and under the influence of the lever 22, disengages the edge 7 of the shutter plate from the offset 6, and said shutter plate is returned to its former position under the influence of a spring 41. During such movement the exposure is made, the shield 25 having been drawn aside owing to the actuation of the lever of which it forms a part. The shifting of the link 27 in addition to the performance of its function stated above also rocks the lever 28 about its fulcrum, which lever in turn moves the shaft 10 longitudinally owing to its engagement with the collars 30, and withdraws the pinion 9 from engagement with the rack bar 8, thus permitting the shutter plate to descend. It will be obvious that a second exposure cannot be made until the shutter plate is raised, and this can obviously not occur unless the film spool 19 is rotated to expose another section of the film. In this manner the double exposure of a film section is absolutely obviated.

When a time exposure is to be made, the lever 32 is rocked on its fulcrum by means of the extension 33, so as to project the end of the rod 36 into the path of movement of the lower end of the shutter plate, the plate having presumably been previously raised. The act of setting the lever 32 for a time exposure also moves the shaft 10 longitudinally so as to withdraw the pinion 9 from engagement with the rack bar 8. Thus when the lever 22 is shifted to bring about the exposure, the descent of the shutter plate is limited by its engagement with the rod 36, and is brought to rest in a position wherein the openings 3 and 5 are in registration. At the termination of the exposure period, the extension 33 of the lever 32 may be raised, thereby permitting the further descent of the shutter plate and the exposure opening is thereby closed. It will be noted that during this intermediate position of the shutter plate, the shield 25 is retained to one side of the exposure opening owing to the fact that the shaft 10 is retained in its abnormal position, and the connection of said shield element with the shaft. A lateral notch 42 should be provided in the recess 4 for temporarily retaining the lever 33 in its time exposure position.

While I have illustrated and described my invention with some degree of particularity, I realize that in practice various alterations thereover may be made, and I therefore reserve the right and privilege of changing the form of the details of construction or otherwise altering the arrangement of the correlated parts without departing from the spirit of the invention, or the scope of the appended claims.

Having thus described my invention what I claim as new and desire to secure by Letters Patent is:—

1. A camera including in combination a casing, film roller mechanism, a movable shutter plate, means operable by actuation of the film mechanism for moving the plate to position prior to exposure of the film, means for shielding the camera lens during such movement of the plate, and means for releasing the plate and removing the shield to permit exposure of the film.

2. A camera including in combination a casing, film roller mechanism, a sliding shutter plate, a rack bar on said plate, a shaft rotatably mounted on the casing and adapted for longitudinal movement, a pinion on the shaft engaging the rack bar, means operable by the film roller mechanism for rotating the shaft to slide the plate into position preparatory to an exposure of the film, and means for withdrawing the pinion from engagement with the rack bar to release the plate and thereby expose the film.

3. A camera including in combination a casing, film roller mechanism including a spool, a sliding shutter plate, a rack bar on said plate, a shaft mounted on the casing for longitudinal and rotative movement, a second pinion on the shaft, a pinion rotatable with the spool, an idler pinion in engagement with the spool pinion and second shaft pinion, means for preventing rotation of the idler pinion in one direction, whereby the shutter plate may be moved to position prior to exposure simultaneously with the positioning of an unexposed film section, means for securing the plate in its position, means for releasing the plate to make an exposure, and means to withdraw the pinion from the rack bar to permit movement of the plate.

4. A camera including in combination a casing, a shutter plate slidably mounted thereon and having one edge cut away to provide a ledge, an offset portion adapted to be engaged by the ledge when the plate is moved to position prior to exposure, a lever pivotally mounted and having a shield adapted to cover the exposure opening of the camera during such movement of the shutter, and means on the lever for dislodging the plate from its engagement as aforesaid to permit its return to original position thereby making an exposure, the shield being removable during such exposure from the exposure opening, and means for resiliently returning said plate to original position.

5. A camera including in combination a casing, film roller mechanism, a sliding shutter plate, a rack bar on said plate, a shaft mounted on said casing for longitudinal and rotative movement, a pinion on the shaft for engaging the rack bar, means operable by the film roller mechanism for rotating the shaft and thereby position the plate prior to an exposure, a lever pivoted to the casing, a second lever pivoted to the casing and having loose connection with the shaft, a link connecting the levers, said link being operable when moved by the first mentioned lever to release the plate, and to move the shaft longitudinally through the medium of the second lever to withdraw the pinion from engagement with the rack bar to permit the return of the plate to its original position.

In testimony whereof I affix my signature in presence of two witnesses.

CHARLES E. GRENELL.

Witnesses:
R. L. SMITH,
D. P. SNOOK.

Copies of this patent may be obtained for five cents each, by addressing the "Commissioner of Patents, Washington, D. C."